United States Patent
Wang et al.

(10) Patent No.: US 12,219,332 B1
(45) Date of Patent: Feb. 4, 2025

(54) AUDIO SYNCHRONIZATION PLAYBACK METHOD, SYSTEM AND STORAGE MEDIUM

(71) Applicant: Linkplay Technology Inc., Newark, CA (US)

(72) Inventors: Huaijing Wang, Newark, CA (US); Lifeng Zhao, Newark, CA (US)

(73) Assignee: Linkplay Technology Inc., Newark, CA (US)

( * ) Notice: Subject to any disclaimer, the term of this patent is extended or adjusted under 35 U.S.C. 154(b) by 0 days.

(21) Appl. No.: 18/922,808

(22) Filed: Oct. 22, 2024

(30) Foreign Application Priority Data

Apr. 18, 2024 (CN) .......................... 202410468081.1

(51) Int. Cl.
*H04R 3/12* (2006.01)
*G11B 27/34* (2006.01)
*H04R 29/00* (2006.01)

(52) U.S. Cl.
CPC .............. *H04R 3/12* (2013.01); *G11B 27/34* (2013.01); *H04R 29/002* (2013.01)

(58) Field of Classification Search
CPC ....... G06F 3/167; G06Q 40/04; G10L 19/018; G11B 20/10037; G11B 27/34;
(Continued)

(56) References Cited

U.S. PATENT DOCUMENTS 11,758,326 B2 * 9/2023 Delhoume ....... H04N 21/44227
 381/80
12,132,952 B1 * 10/2024 Dhanapalan ........... H04N 21/44
(Continued)

FOREIGN PATENT DOCUMENTS

CN 104735772 A 6/2015
CN 105450382 A 3/2016
(Continued)

OTHER PUBLICATIONS

First Office Action issued in counterpart Chinese Patent Application No. 202410468081.1, dated May 29, 2024.
(Continued)

*Primary Examiner* — Gerald Gauthier
(74) *Attorney, Agent, or Firm* — Westbridge IP LLC (57) ABSTRACT

An audio synchronization playback method includes: obtaining, by the primary playback device, target audio data; sending, by the primary playback device, the target audio data to at least one secondary playback device for playback; synchronizing, by the primary playback device, local time of the primary playback device with local time of the reference clock device based on a target audio synchronization signal in response to receiving the target audio synchronization signal and obtaining, by the primary playback device, reference playback timestamp of the target audio synchronization signal; where the target audio synchronization signal is a periodic signal sent by the reference clock device, and the reference clock device is the primary playback device or one secondary playback device of the preset quantity of secondary playback devices; and starting, by the primary playback device, playback from a target audio data frame corresponding to the reference playback timestamp.

12 Claims, 6 Drawing Sheets

(58) Field of Classification Search
CPC .............. H04M 1/72412; H04N 7/142; H04N 21/4126; H04N 21/439; H04N 21/44; H04N 21/44227; H04N 21/8547; H04R 3/12; H04R 27/00; H04R 29/002; H04S 1/10; H04S 3/008; H04W 52/0219; H05K 5/03

See application file for complete search history.

(56) References Cited

U.S. PATENT DOCUMENTS

| | | | | |
|---|---|---|---|---|
| 12,136,428 B1* | 11/2024 | Agaskar | ................ | G10L 19/018 |
| 2008/0045140 A1* | 2/2008 | Korhonen | .......... | H04M 1/72412 |
| | | | | 455/3.06 |
| 2013/0129122 A1* | 5/2013 | Johnson | ................... | H04S 1/00 |
| | | | | 381/306 |
| 2014/0086431 A1* | 3/2014 | Martin | ..................... | H05K 5/03 |
| | | | | 381/80 |
| 2014/0177864 A1* | 6/2014 | Kidron | ................ | H04N 21/439 |
| | | | | 381/80 |
| 2018/0020253 A1* | 1/2018 | Møller | ............... | H04N 21/4126 |
| 2018/0020309 A1* | 1/2018 | Banerjee | .......... | G11B 20/10037 |
| 2018/0070187 A1* | 3/2018 | Drinkwater | ............ | H04R 27/00 |
| 2018/0233137 A1* | 8/2018 | Torok | ..................... | G06F 3/167 |
| 2020/0314539 A1* | 10/2020 | Borowski | .............. | H04N 7/142 |
| 2021/0058179 A1* | 2/2021 | Bowler | ............. | H04W 52/0219 |
| 2021/0405962 A1* | 12/2021 | Mackay | .............. | H04N 21/8547 |
| 2022/0386026 A1* | 12/2022 | Singh | ..................... | H04S 3/008 |
| 2024/0314379 A1* | 9/2024 | Wilberding | ............ | G06Q 40/04 |

FOREIGN PATENT DOCUMENTS

| | | |
|---|---|---|
| CN | 106912100 A | 6/2017 |
| CN | 109450490 A | 3/2019 |
| CN | 113055149 A | 6/2021 |
| CN | 113168850 A | 7/2021 |
| CN | 113194528 A | 7/2021 |
| CN | 113300797 A | 8/2021 |
| CN | 113365127 A | 9/2021 |
| CN | 117354566 A | 1/2024 |
| CN | 117793879 A | 3/2024 |

OTHER PUBLICATIONS

Notification to Grant Patent Right for Invention issued in counterpart Chinese Patent Application No. 202410468081.1, dated Sep. 18, 2024.

Second Office Action issued in counterpart Chinese Patent Application No. 202410468081.1, dated Jul. 31, 2024.

* cited by examiner

AUDIO SYNCHRONIZATION PLAYBACK METHOD, SYSTEM AND STORAGE MEDIUM

CROSS-REFERENCE TO RELATED APPLICATIONS

This application claims priority to Chinese Patent Application No. 202410468081.1, filed on Apr. 18, 2024, the content of which is incorporated herein by reference in its entirety.

TECHNICAL FIELD

The present application relates to the field of audio control technologies, in particular to an audio synchronization playback method, an audio synchronization playback system and a storage medium.

BACKGROUND

With the advancement of technology and the improvement of people's living standards, a multi-room audio system has become the choice of more and more music enthusiasts and audiophiles with higher demands for music quality. To ensure the user's audiovisual experience, a plurality of devices in the multi-room audio system needs to play music synchronously.

Currently, most multi-room audio systems use the clock synchronization standard protocol of WiFi for clock synchronization, thereby achieving synchronized audio playback. However, this manner has limited synchronization effectiveness, often resulting in audio delays perceptible to the human ear and low synchronization precision.

SUMMARY

An object of the present application is to provide an audio synchronization playback method, an audio synchronization playback system and a storage medium.

In a first aspect, the present application provides an audio synchronization playback method, applied to an audio synchronization playback system including a primary playback device and a preset quantity of secondary playback devices, including:
  obtaining, by the primary playback device, target audio data in response to receiving a synchronization playback command;
  sending, by the primary playback device, the target audio data to at least one secondary playback device for playback;
  synchronizing, by the primary playback device, local time of the primary playback device with local time of the reference clock device based on a target audio synchronization signal in response to receiving the target audio synchronization signal and obtaining, by the primary playback device, reference playback timestamp of the target audio synchronization signal; where the target audio synchronization signal is a periodic signal sent by the reference clock device, and the reference clock device is the primary playback device or one secondary playback device of the preset quantity of secondary playback devices; and
  starting, by the primary playback device, playback from a target audio data frame corresponding to the reference playback timestamp.

In a second aspect, the present application provides an audio synchronization playback method, applied to an audio synchronization playback system including a primary playback device and a preset quantity of secondary playback devices, including:
  playing, by a secondary playback device, target audio data in response to receiving the target audio data from the primary playback device;
  synchronizing, by the secondary playback device, local time of the secondary playback device with local time of the reference clock device based on the target audio synchronization signal in response to receiving the target audio synchronization signal and obtaining, by the secondary playback device, the reference playback timestamp of the target audio synchronization signal; where the target audio synchronization signal is a periodic signal sent by the reference clock device, and the reference clock device is the primary playback device or one secondary playback device of the preset quantity of secondary playback devices; and
  starting, by the secondary playback device, playback from a target audio data frame corresponding to the reference playback timestamp.

In a third aspect, the present application provides an audio synchronization playback method, applied to an audio synchronization playback system including the above-mentioned primary playback device and a preset quantity of secondary playback devices, including:
  playing, by a reference clock device, target audio data in response to detecting the target audio data; wherein the reference clock device is the primary playback device or one secondary playback device of the preset quantity of secondary playback devices;
  obtaining, by the reference clock device, a current playback timestamp of the target audio data and a transmission time value of a signal between a sound card and a speaker in the reference clock device at a preset sampling period, to obtain the reference playback timestamp and a delay calibration value of the reference clock device;
  determining, by the reference clock device, reference local time of the reference clock device based on current local time and the delay calibration value of the reference clock device;
  generating, by the reference clock device, a target audio synchronization signal based on the reference local time of the reference clock device and the reference playback timestamp; and
  broadcasting, by the reference clock device, the target audio synchronization signal.

In a fourth aspect, the present application provides an audio synchronization playback system, including a primary playback device and a preset quantity of secondary playback devices, where the audio synchronization playback system is configured to perform the above-mentioned audio synchronization playback method.

In a fifth aspect, the present application provides a computer-readable storage medium having stored thereon instructions, where the instructions, when executed on a computer, cause the computer to perform the above-mentioned audio synchronization playback method.

DETAILED DESCRIPTION OF THE EMBODIMENTS

The present application provides an audio synchronization playback method, an audio synchronization playback system and a storage medium, so as to improve the precision of synchronization playback.

Terms such as "first", "second", "third" and "fourth" (if present) in the description, claims and drawings of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

To facilitate comprehension, the audio synchronization playback system is first explained. The audio synchronization playback system includes a plurality of playback devices. A local area network (LAN) supporting the TCP/IP communication protocol is pre-established. There are two manners for establishing the LAN. A first manner is that the plurality of playback devices is connected via wireless signal to a same router or connected to a switch of a router through Ethernet lines. A second manner is that the plurality of playback devices is connected to an established Wi-Fi hotspot, where Wi-Fi peer-to-peer (P2P) technology is used to establish a LAN that supports TCP/IP communication, allowing any two playback devices to communicate within the established LAN.

Figure 1:
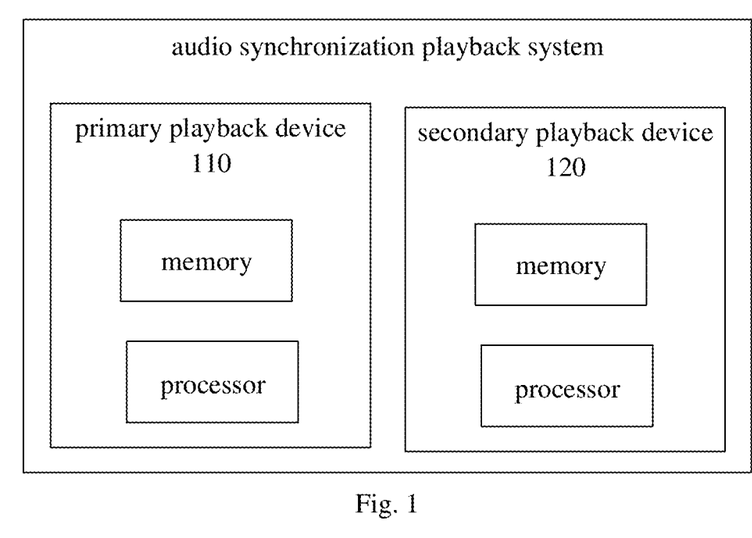
FIG. 1 is a schematic diagram of an embodiment of an audio synchronization playback system according to the embodiments of the present application.

Usually, the audio synchronization playback system is used in a place with a plurality of zones, such as a building with a plurality of rooms, an industrial park with several regions, or a small town with a plurality of road segments. As shown in FIG. 1, one playback device in the audio synchronization playback system is the primary playback device 110, and the other playback devices are secondary playback devices 120. The primary playback device 110 and the secondary playback devices 120 each include a processor and a memory, where the memory is used to store programs, and the processor is used to execute the programs in the memory.

The primary playback device and the secondary playback devices are distributed based on actual needs. The primary playback device and the secondary playback devices may be in different zones, or in a same zone. One zone may have one playback device or multiple playback devices, which is not particularly defined herein. Therefore, the audio synchronization playback system includes one primary playback device and a preset quantity of secondary playback devices.

The primary playback device and the secondary playback devices have a same or compatible playback application installed. The primary playback device is used to send audio data for synchronized playback to the secondary playback devices. After receiving the audio data from the primary playback device, the secondary playback devices play the audio data. The main playback device automatically plays the audio data after sending the audio data. In addition, one playback device is selected as a reference clock device from among the primary playback device and the preset quantity of secondary playback devices. The reference clock device may be the primary playback device or the secondary playback device. The reference clock device periodically sends an audio synchronization signal, and the audio synchronization signal includes local clock information of the reference clock device and a reference playback timestamp of the audio data on the reference clock device. The primary or secondary playback device that receives the audio synchronization signal synchronizes its local time with local time of the reference clock device according to the local clock information of the reference clock device. After local time synchronization, a time reference for each playback device to play the target audio data is the same. The primary playback device and the secondary playback device each determine a target audio data frame corresponding to the reference playback timestamp in the respective target audio data played by the primary playback device and the secondary playback device based on the synchronized local time, and start playback from the target audio data frame. Therefore, it is able to eliminate a time difference caused by hardware differences, thereby improving the precision of synchronization playback.

Preferably, a playback device with a smallest clock error calibration value among the primary playback device and the preset quantity of secondary playback devices is determined as the reference clock device. The smaller the clock error of the reference clock device, the more stable the period of the provided audio synchronization signal. The smaller the accumulated time difference within one period for the primary and secondary playback devices, the higher the synchronization playback precision of the primary and secondary playback devices.

The specific process of the embodiments of the present application is described below. Please refer to FIG. 2, an embodiment of an audio synchronization playback method according to the embodiments of the present application includes the following steps 201-204.

Figure 2:
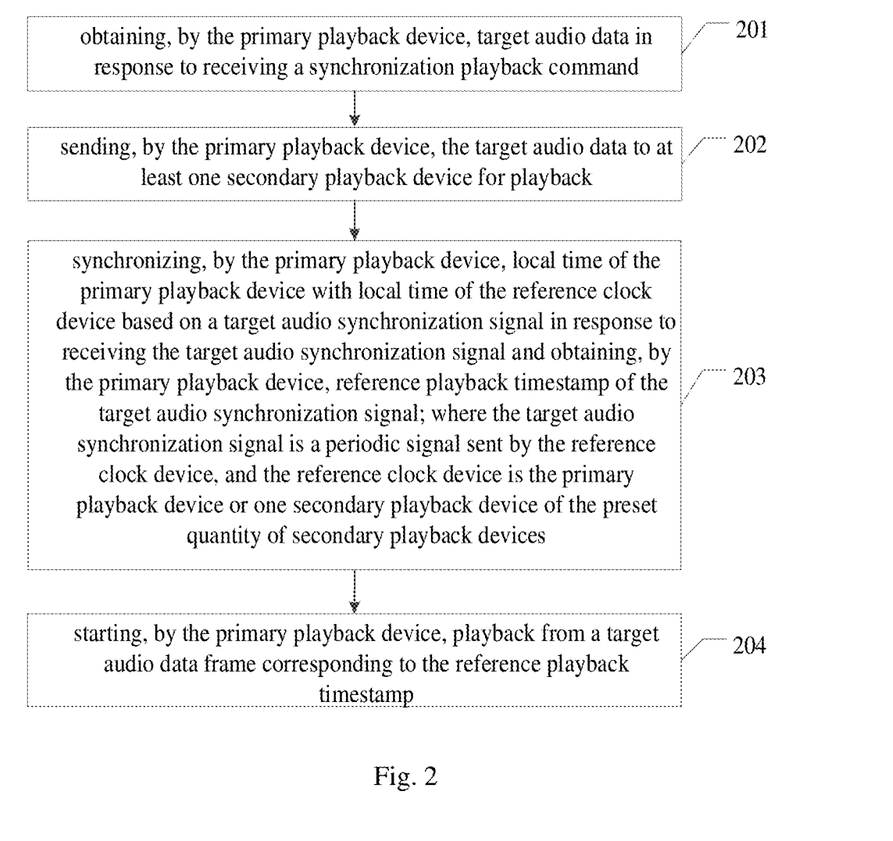
FIG. 2 is a schematic diagram of an embodiment of an audio synchronization playback method according to the embodiments of the present application.

Step 201, obtaining, by the primary playback device, target audio data in response to receiving a synchronization playback command.

As can be appreciated, an entity for performing the embodiments of the present application may be the audio synchronous playback system or the primary playback device. In this embodiment, a case where the primary playback device serves as the entity is taken as an example for illustration.

The primary playback device may be a designated playback device or a device that receives a synchronous playback command. When the primary playback device receives the synchronous playback command, the primary playback device obtains the target audio data to be synchronously played. The target audio data includes an initial timestamp sequence, and each audio frame of the target audio data corresponds to a timestamp.

For example, a building has 10 rooms, each equipped with a playback device numbered as Playback Device 1, Playback Device 2, . . . . Playback Device 10. In a case where Playback Device 1 is pre-designated as the primary playback device, when Playback Device 1 receives a synchronization playback command, Playback Device 1 obtains the target audio data. In a case where no primary playback device is pre-designated and Playback Device 2 receives a synchronization playback command, Playback Device 2 becomes the primary playback device and obtains the target audio data. The synchronization playback command is a playback command generated after a user interacts with the playback device.

In specific, the primary playback device obtains original audio data indicated by the synchronization playback command in response to receiving the synchronization playback command, where the original audio data is in Pulse Code Modulation (PCM) format. The primary playback device obtains scenario information, where the scenario information includes an audio type and network bandwidth information of the original audio data, and performs selection on preset encoding compression algorithms according to the audio type, where the audio type includes audio data format and audio data encoding. It is able to provide encoding compression algorithms with optimal sound quality when performing selection according to the audio type, so as to obtain a set of encoding compression algorithms. Next, the primary playback device selects an algorithm from the set of encoding compression algorithms that matches the network bandwidth information. In a case where network bandwidth is greater than a threshold, the primary playback device selects an encoding compression algorithm with the smallest compression ratio from the set of encoding compression algorithms. In a case where the network bandwidth is less than or equal to the threshold, the primary playback device selects an encoding compression algorithm whose compression ratio matches the network bandwidth information from the set of encoding compression algorithms. Thus, the target encoding compression algorithm is obtained. The primary playback device performs encoding and compression on the original audio data based on the target encoding compression algorithm. The primary playback device adds a timestamp to each compressed audio data frame to obtain the target audio data.

Step 202, sending, by the primary playback device, the target audio data to at least one secondary playback device for playback.

The primary playback device analyzes the synchronization playback command to obtain a set of synchronization devices. The set of synchronization devices includes at least one secondary playback device for audio synchronization playback. The quantity of secondary playback devices in the set of synchronization devices is less than or equal to the quantity of secondary playback devices in the audio synchronization playback system. That is, the secondary playback devices for audio synchronization playback may be all or part of the secondary playback devices in the audio synchronization playback system. The primary playback device sends the target audio data to the secondary playback devices in the set of synchronization devices for playback. After sending the target audio data, the primary playback device automatically plays the target audio data.

Step 203, synchronizing, by the primary playback device, local time of the primary playback device with local time of the reference clock device based on a target audio synchronization signal in response to receiving the target audio synchronization signal and obtaining, by the primary playback device, reference playback timestamp of the target audio synchronization signal; where the target audio synchronization signal is a periodic signal sent by the reference clock device, and the reference clock device is the primary playback device or one secondary playback device of the preset quantity of secondary playback devices.

Since the reference clock device may be the primary playback device or not, in this embodiment, a case where the reference clock device is not the primary playback device is taken as an example for illustration.

The reference clock device periodically sends the target audio synchronization signal. The target audio synchronization signal includes the reference local time of the reference clock device and the reference playback timestamp of the target audio data on the reference clock device. The primary playback device synchronizes its local time with the reference local time of the reference clock device according to the reference local time of the reference clock device.

In specific, the primary playback device analyzes the target audio synchronization signal to obtain the reference local time and the reference playback timestamp of the reference clock device in response to receiving the target audio synchronization signal, where the reference playback timestamp indicates a position of the audio data frame currently being played by the reference clock device, and the primary playback device performs time synchronization based on the reference local time of the reference clock device. The time synchronization manner is as follows. The primary playback device determines a transmission time value of a signal between a sound card and a speaker, to obtain a delay calibration value of the primary playback device. Next, the primary playback device determines current local time of the primary playback device based on the reference local time of the reference clock device and the delay calibration value of the primary playback device. This time synchronization manner can eliminate hardware parameter differences between playback devices, thereby ensuring that time references for audio outputted from the primary playback device and the reference clock device maintains the same. The primary playback device and the reference clock device are within the same local area network, the signal transmission speed reaches the microsecond level or higher, so the time synchronization precision between the primary playback device and the reference clock device is high, and the synchronization playback precision when playing audio is also high.

Optionally, before the primary playback device synchronizes its local time with the reference local time of the reference clock device based on the target audio synchronization signal and obtains the reference playback timestamp of the target audio synchronization signal, in order to avoid interference caused by other devices broadcasting synchronization signals simultaneously with the reference clock device, the primary playback device first determines whether the received synchronization signal is the target audio synchronization signal sent by the reference clock device. In specific, the primary playback device identifies the reference clock device in the audio synchronization playback system, where the reference clock device is a playback device with a smallest clock error calibration value among the primary playback device and at least one secondary playback device, and the clock error calibration value is a calibration value pre-written into the playback device. When receiving a synchronization signal, the primary playback device determines whether the received synchronization signal is a signal sent by the reference clock device. If yes, the primary playback device determines that the target audio synchronization signal is received. If no, the primary playback device determines that the target audio synchronization signal is not detected.

Step 204, starting, by the primary playback device, playback from a target audio data frame corresponding to the reference playback timestamp.

The primary playback device determines the target audio data frame in the target audio data corresponding to the reference playback timestamp, and moves to the target audio data frame for decoding and playback. After the primary playback device performs local time synchronization with the reference clock device, the time synchronization precision between the primary playback device and the reference clock device is improved. The primary playback device moves to a position with a same playback progress as the reference clock device based on the reference playback timestamp and continues to play, without upgrading the hardware of the playback device, microsecond-level audio synchronization playback effect can be achieved.

In specific, the primary playback device calculates a time difference between the primary playback device and the reference clock device in each period at a first preset period to obtain a system time difference of the primary playback device, where the time difference is a difference between a timestamp of an audio frame currently being played on the primary playback device and a timestamp of an audio frame currently being played on the reference clock device. The primary playback device determines an output sampling rate of the primary playback device according to the system time difference of the primary playback device, and starts decoding from the target audio data frame corresponding to the reference playback timestamp. Further, the primary playback device starts sampling and playback from the decoded target audio data frame based on the output sampling rate of the primary playback device.

The primary playback device determines the output sampling rate based on the system time difference as follows.

Firstly, an absolute value of the system time difference from a previous period is compared with a difference threshold.

Secondly, when the absolute value of the system time difference is less than or equal to the difference threshold, the primary playback device does not adjust the output sampling rate.

Thirdly, when the absolute value of the system time difference is greater than the difference threshold, the primary playback device determines a sampling adjustment value based on a first preset formula. The first preset formula is as follows.

$$D = \frac{VT \times K}{N}$$

D is the sampling adjustment value of the primary playback device in a next period, VT is the system time difference of the primary playback device in the previous period, K is a preset scaling factor, and N is the quantity of audio frames of the target audio data in a buffer.

Lastly, the primary playback device determines an output sampling rate for the next period based on the sampling adjustment value and a second preset formula. The second preset formula is as follows.

$$S_2 = S_1 \times (1+D))$$

S2 is an output sampling rate of the primary playback device in the next period, S1 is an output sampling rate of the primary playback device in the previous period, and D is the sampling adjustment value of the primary playback device in the next period.

Through adjusting the output sampling rate, it is able to compensate for the time error accumulated in the buffer of the primary playback device during the playback of the target audio data, thereby further ensuring synchronization in the audio playback process.

In the embodiments of the present application, the primary playback device sends the target audio data to at least one secondary playback device for synchronization playback, the reference clock device periodically broadcasts the target audio synchronization signal, and the primary playback device periodically performs clock synchronization with the reference clock device based on the target audio synchronization signal, so as to eliminate hardware parameter differences between the primary playback device and the reference clock device, thereby achieving precise local time synchronization between the primary playback device and the reference clock device. The primary playback device adjusts its playback progress based on the synchronized time reference and the reference playback timestamp included in the target audio synchronization signal, so as to achieve synchronization of playback timestamps. Local time synchronization and playback timestamp synchronization together enhance the precision of audio synchronization playback between the primary playback device and the reference clock device.

Next, a case where the primary playback device serves as the reference clock device is taken as an example for illustration. Please refer to FIG. 3, an embodiment of the audio synchronization playback method in the embodiments of the present application includes the following steps 301-308.

Figure 3:
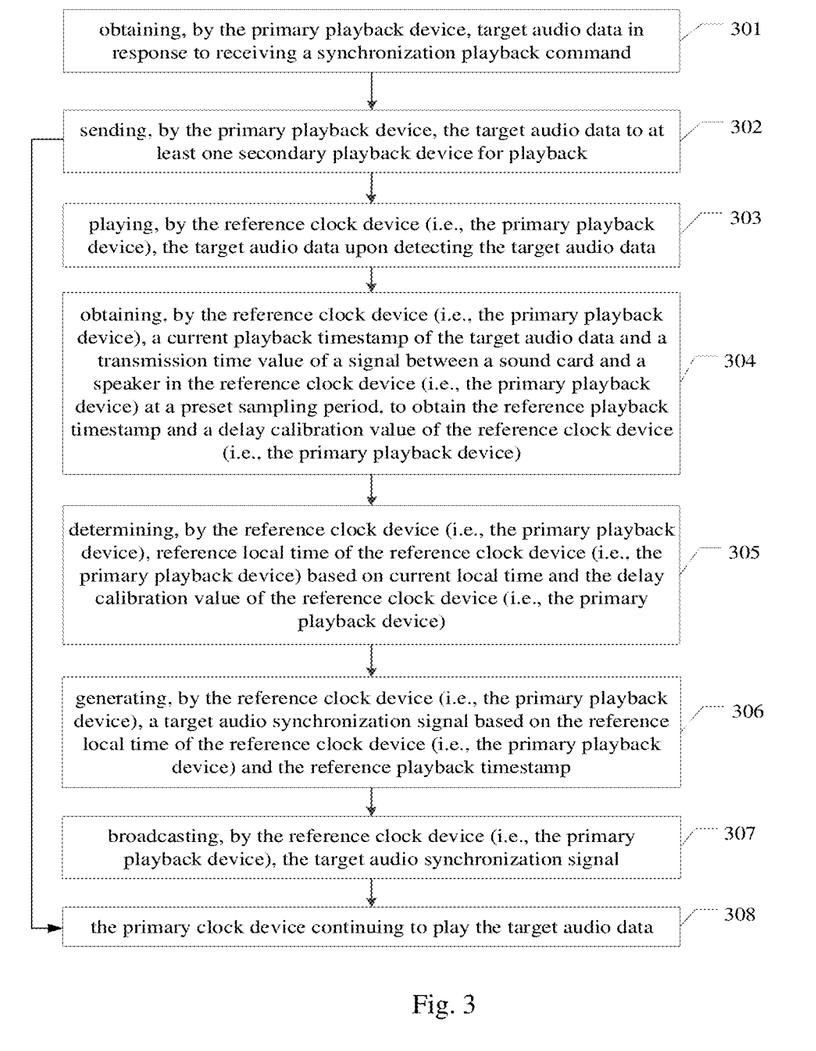
FIG. 3 is a schematic diagram of another embodiment of the audio synchronization playback method according to the embodiments of the present application.

Step 301, obtaining, by the primary playback device, target audio data in response to receiving a synchronization playback command.

As can be appreciated, an entity for performing the embodiments of the present application may be the audio synchronous playback system or the primary playback device. In this embodiment, a case where the primary playback device serves as the entity is taken as an example for illustration.

Step 302, sending, by the primary playback device, the target audio data to at least one secondary playback device for playback.

Steps 301-302 in this embodiment are the same as steps 201-202 and are not elaborated again herein.

Step 303, playing, by the reference clock device (i.e., the primary playback device), the target audio data upon detecting the target audio data.

Since the target audio data already exists in the reference clock device (i.e., the primary playback device), after the reference clock device (i.e., the primary playback device) sends the target audio data to at least one secondary playback device, the reference clock device (i.e., the primary playback device) plays the detected target audio data.

Step 304, obtaining, by the reference clock device (i.e., the primary playback device), a current playback timestamp of the target audio data and a transmission time value of a signal between a sound card and a speaker in the reference clock device (i.e., the primary playback device) at a preset sampling period, to obtain the reference playback timestamp and a delay calibration value of the reference clock device (i.e., the primary playback device).

The reference playback timestamp is a timestamp corresponding to the current playback progress of the target audio data in the reference clock device (i.e., primary playback device). The transmission time value of the signal between the sound card and the speaker is a delay time value that exists between the audio card outputting audio data and the speaker outputting sound. Differences in hardware parameters between playback devices cause variations in the delay time value.

Step 305, determining, by the reference clock device (i.e., the primary playback device), reference local time of the reference clock device (i.e., the primary playback device) based on current local time and the delay calibration value of the reference clock device (i.e., the primary playback device).

The reference clock device (i.e., the primary playback device) determines a sum of the current local time and the delay calibration value of the reference clock device (i.e., the primary playback device) as the reference local time of the reference clock device (i.e., the primary playback device). Subsequently, the secondary playback device subtracts its delay calibration value from the reference local time to obtain the local time of the secondary playback device. In this way, regardless of the hardware parameter differences between the reference clock device (i.e., the primary playback device) and the secondary playback device, time references for audio output maintain the same.

Step 306, generating, by the reference clock device (i.e., the primary playback device), a target audio synchronization signal based on the reference local time of the reference clock device (i.e., the primary playback device) and the reference playback timestamp.

The reference clock device (i.e., the primary playback device) combines the reference local time of the reference clock device (i.e., the primary playback device) with the reference playback timestamp, to generate the target audio synchronization signal.

Step 307, broadcasting, by the reference clock device (i.e., the primary playback device), the target audio synchronization signal.

The reference clock device (i.e., the primary playback device) broadcasts the target audio synchronization signal, allowing the primary playback device and at least one secondary playback device to receive the target audio synchronization signal.

Step 308, the primary clock device continuing to play the target audio data.

When the primary playback device serves as the reference clock device, the primary playback device compares its actual crystal oscillator frequency with the standard crystal oscillator frequency, to obtain a frequency difference of the crystal oscillator of the primary playback device, and subsequently obtain the time difference of the primary playback device. The primary playback device adjusts the output sampling rate of the primary playback device based on the time difference of the primary playback device, so as to achieve accuracy in playing the target audio data and improve synchronization precision.

In other words, when the primary playback device and the reference clock device are different playback devices, the output sampling rate is adjusted based on the time difference between the primary playback device and the reference clock device, so as to eliminate hardware parameter differences between different devices. When the primary playback device and the reference clock device are the same playback device, the output sampling rate is adjusted based on the time difference of the primary playback device, so as to eliminate the time difference caused by its own frequency difference of the crystal oscillator, and further improve synchronization precision.

In specific, the primary playback device calculates the frequency difference of the crystal oscillator of the primary playback device in each period at a second preset period, where the second preset period may be the same as or different from the first preset period. The primary playback device determines a system time difference of the primary playback device according to the frequency difference of the crystal oscillator of the primary playback device, determines an output sampling rate of the primary playback device according to the system time difference of the primary playback device, and performs sampling and playback on the target audio data based on the output sampling rate of the primary playback device.

The primary playback device determines the output sampling rate based on the system time difference as follows.

Firstly, an absolute value of the system time difference from a previous period is compared with a difference threshold.

Secondly, when the absolute value of the system time difference is less than or equal to the difference threshold, the primary playback device does not adjust the output sampling rate.

Thirdly, when the absolute value of the system time difference is greater than the difference threshold, the primary playback device determines a sampling adjustment value based on a first preset formula. The first preset formula is as follows.

$$D = \frac{VT \times K}{N}$$

D is the sampling adjustment value of the primary playback device in a next period, VT is the system time difference of the primary playback device in the previous period, K is a preset scaling factor, and N is the quantity of audio frames of the target audio data in a buffer.

Lastly, the primary playback device determines an output sampling rate for the next period based on the sampling adjustment value and a second preset formula. The second preset formula is as follows.

$$S_2 = S_1 \times (1+D))$$

S2 is an output sampling rate of the primary playback device in the next period, S1 is an output sampling rate of the primary playback device in the previous period, and D is the sampling adjustment value of the primary playback device in the next period.

Through adjusting the output sampling rate, it is able to compensate for the time error accumulated in the buffer of the primary playback device during the playback of the target audio data, thereby ensuring synchronization in the audio playback process.

In the embodiments of the present application, the primary playback device sends the target audio data to at least one secondary playback device for synchronization playback. In addition, the primary playback device also acts as the reference clock device, periodically broadcasting the target audio synchronization signal. Each playback device periodically performs clock synchronization with the reference clock device based on the target audio synchronization signal, so as to eliminate hardware parameter differences among the playback devices, thereby achieving precise local time synchronization for each playback device. After local time synchronization, the time reference for playing the target audio data is synchronized among the playback devices, thereby improving the precision of synchronization playback.

Figure 4:
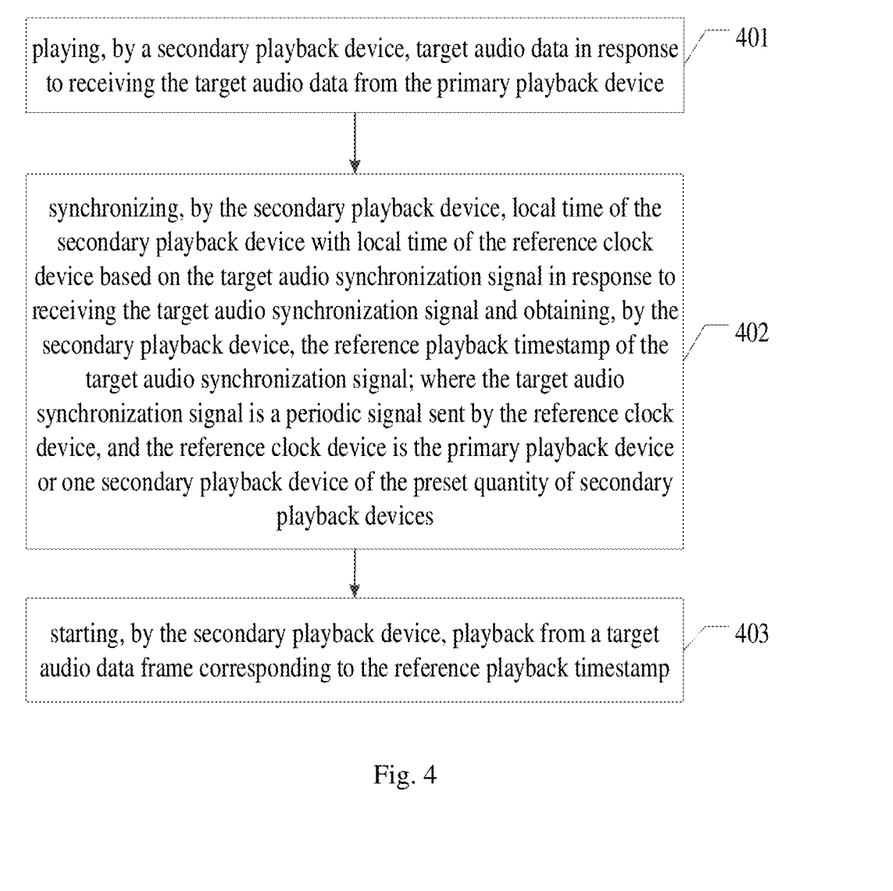
FIG. 4 is a schematic diagram of yet another embodiment of the audio synchronization playback method according to the embodiments of the present application.

Please refer to FIG. 4, yet another embodiment of the audio synchronization playback method according to the embodiments of the present application includes the following steps 401-403.

Step 401, playing, by a secondary playback device, target audio data in response to receiving the target audio data from the primary playback device.

As can be appreciated, an entity for performing the embodiments of the present application may be the audio synchronous playback system or the secondary playback device. In this embodiment, a case where the secondary playback device serves as the entity is taken as an example for illustration.

When the secondary playback device receives the target audio data sent by the primary playback device, it immediately starts playing the received target audio data.

In specific, the secondary playback device determines whether there exists audio data matching the target audio data in a preset database in response to receiving the target audio data sent by the primary playback device. In response to that there exists the audio data matching the target audio data in the preset database, the secondary playback device deletes the audio data matching the target audio data and stores the target audio data in the preset database, so as to reduce redundancy. In response to that there does not exist the audio data matching the target audio data in the preset database, the secondary playback device determines whether available storage space in the preset database is greater than a size of the target audio data. In response to that the available storage space in the preset database is greater than the size of the target audio data, the secondary playback device stores the target audio data in the preset database. In response to that the available storage space in the preset database is not greater than the size of the target audio data, the secondary playback device deletes historical data in the preset database on an individual basis until the available storage space in the preset database is greater than the size of the target audio data, the secondary playback device stores the target audio data in the preset database, and plays the target audio data. The audio data in the preset database may serve as a local audio library, allowing the playback device to perform standalone playback when offline. During synchronization playback, if a temporary network failure occurs, it can still achieve audio synchronization for a certain duration.

Step 402, synchronizing, by the secondary playback device, local time of the secondary playback device with local time of the reference clock device based on the target audio synchronization signal in response to receiving the target audio synchronization signal and obtaining, by the secondary playback device, the reference playback timestamp of the target audio synchronization signal; where the target audio synchronization signal is a periodic signal sent by the reference clock device, and the reference clock device is the primary playback device or one secondary playback device of the preset quantity of secondary playback devices.

Since the reference clock device may be the secondary playback device or not, in this embodiment, a case where the reference clock device is not the secondary playback device is taken as an example for illustration.

The reference clock device periodically sends the target audio synchronization signal. The target audio synchronization signal includes the reference local time of the reference clock device and the reference playback timestamp of the target audio data on the reference clock device. The secondary playback device synchronizes its local time with the reference local time of the reference clock device according to the reference local time of the reference clock device.

In specific, the secondary playback device analyzes the target audio synchronization signal to obtain the reference local time and the reference playback timestamp of the reference clock device in response to receiving the target audio synchronization signal, where the reference playback timestamp indicates a position of the audio data frame currently being played by the reference clock device, and the secondary playback device performs time synchronization based on the reference local time of the reference clock device. The time synchronization manner is as follows. The secondary playback device determines a transmission time value of a signal between a sound card and a speaker, to obtain a delay calibration value of the secondary playback device. Next, the secondary playback device determines current local time of the secondary playback device based on the reference local time of the reference clock device and the delay calibration value of the secondary playback device. This time synchronization manner can eliminate hardware parameter differences between playback devices, thereby ensuring that time references for audio outputted from the secondary playback device and the reference clock device maintains the same. The secondary playback device and the reference clock device are within the same local area network, the signal transmission speed reaches the microsecond level or higher, so the time synchronization precision between the secondary playback device and the reference clock device is high, and the synchronization playback precision when playing audio is also high.

Step 403, starting, by the secondary playback device, playback from a target audio data frame corresponding to the reference playback timestamp.

The secondary playback device determines the target audio data frame in the target audio data corresponding to the reference playback timestamp, and moves to the target audio data frame for decoding and playback. After the secondary playback device performs local time synchronization with the reference clock device, the time synchronization precision between the primary playback device and the reference clock device is improved. The secondary playback device moves to a position with a same playback progress as the reference clock device based on the reference playback timestamp and continues to play, without upgrading the hardware of the playback device, microsecond-level audio synchronization playback effect can be achieved.

In specific, the secondary playback device calculates a time difference between the secondary playback device and the reference clock device in each period at a second preset period to obtain a system time difference of the secondary playback device. The secondary playback device determines an output sampling rate of the secondary playback device according to the system time difference of the secondary playback device, and moves to the target audio data frame corresponding to the reference playback timestamp for decoding. Further, the secondary playback device starts sampling and playback from the decoded target audio data frame based on the output sampling rate of the secondary playback device.

The manner by which the secondary playback device determines the output sampling rate based on system time difference is similar to the manner used in step 204, where the primary playback device determines the output sampling rate based on system time difference, which is not elaborated again herein.

In the embodiments of the present application, the secondary playback device receives the target audio data from the primary playback device and plays the target audio data. The reference clock device periodically broadcasts the target audio synchronization signal, and the secondary playback device periodically performs clock synchronization with the reference clock device based on the target audio synchronization signal, so as to eliminate hardware parameter differences between the secondary playback device and the reference clock device, thereby achieving precise local time synchronization between the secondary playback device and the reference clock device. After local time synchronization, the time reference for playing the target audio data is synchronized among the playback devices. The secondary playback device adjusts its playback progress based on the synchronized time reference and the reference playback timestamp included in the target audio synchronization signal, thereby improving the precision of synchronized playback.

Next, a case where a secondary playback device serves as the reference clock device is taken as an example for illustration. Please refer to FIG. 5, still yet another embodiment of the audio synchronization playback method according to the embodiments of the present application includes the following steps 501-506.

Figure 5:
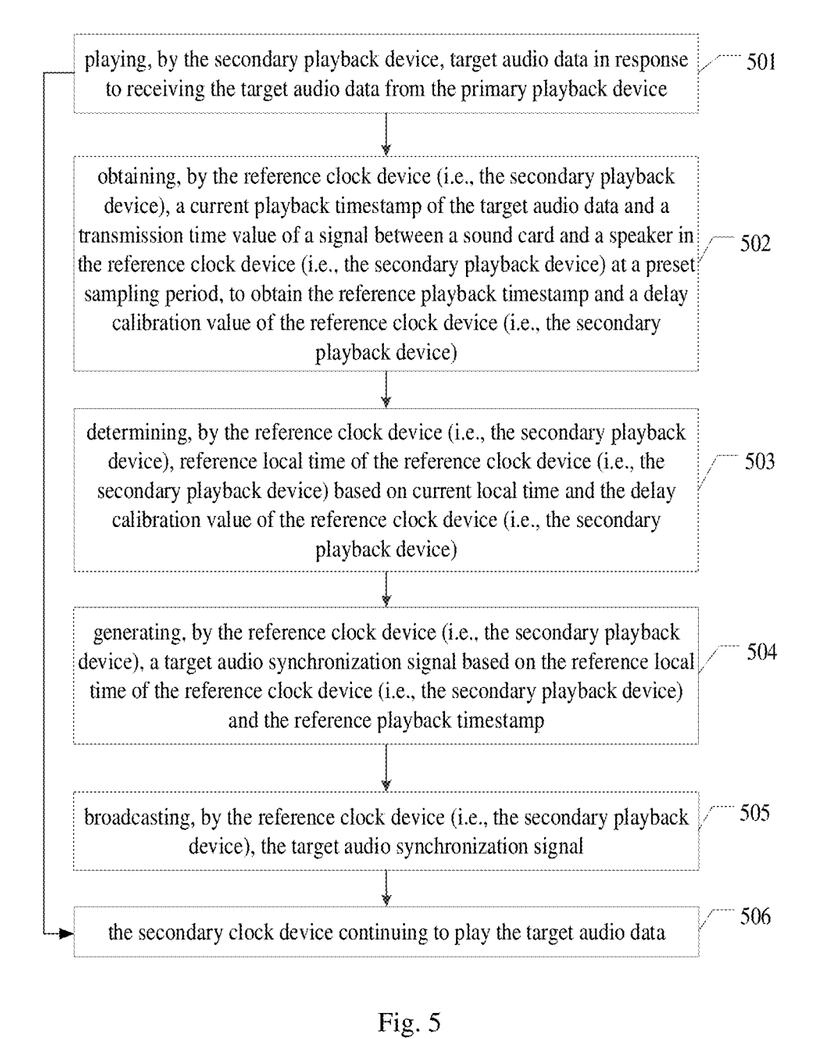
FIG. 5 is a schematic diagram of still yet another embodiment of the audio synchronization playback method according to the embodiments of the present application.

Step 501, playing, by the secondary playback device, target audio data in response to receiving the target audio data from the primary playback device.

Step 501 in this embodiment is the same as step 401 and is not elaborated again herein.

Step 502, obtaining, by the reference clock device (i.e., the secondary playback device), a current playback timestamp of the target audio data and a transmission time value of a signal between a sound card and a speaker in the reference clock device (i.e., the secondary playback device) at a preset sampling period, to obtain the reference playback timestamp and a delay calibration value of the reference clock device (i.e., the secondary playback device).

The reference playback timestamp is a timestamp corresponding to the current playback progress of the target audio data in the reference clock device (i.e., secondary playback device). The transmission time value of the signal between the sound card and the speaker is a delay time value that exists between the audio card outputting audio data and the speaker outputting sound. Differences in hardware parameters between playback devices cause variations in the delay time value.

Step 503, determining, by the reference clock device (i.e., the secondary playback device), reference local time of the reference clock device (i.e., the secondary playback device) based on current local time and the delay calibration value of the reference clock device (i.e., the secondary playback device).

The reference clock device (i.e., the secondary playback device) determines a sum of the current local time and the delay calibration value of the reference clock device (i.e., the secondary playback device) as the reference local time of the reference clock device (i.e., the secondary playback device). Subsequently, each of other secondary playback devices or the primary playback device subtracts a delay calibration value of a corresponding playback device from the reference local time to obtain the local time of each playback device. In this way, regardless of the hardware parameter differences between the reference clock device (i.e., the secondary playback device) and other playback devices, time references for audio output maintain the same.

Step 504, generating, by the reference clock device (i.e., the secondary playback device), a target audio synchronization signal based on the reference local time of the reference clock device (i.e., the secondary playback device) and the reference playback timestamp.

The reference clock device (i.e., the secondary playback device) combines the reference local time of the reference clock device (i.e., the secondary playback device) with the reference playback timestamp, to generate the target audio synchronization signal.

Step 505, broadcasting, by the reference clock device (i.e., the secondary playback device), the target audio synchronization signal.

The reference clock device (i.e., the secondary playback device) broadcasts the target audio synchronization signal, allowing the primary playback device and at least one secondary playback device to receive the target audio synchronization signal.

Step 506, the secondary clock device continuing to play the target audio data.

The secondary playback device calculates a frequency difference of a crystal oscillator of the secondary playback device in each period at a second preset period, and determines a system time difference of the secondary playback device according to the frequency difference of the crystal oscillator of the secondary playback device. Next, the secondary playback device determines an output sampling rate of the secondary playback device according to the system time difference of the secondary playback device, and performs sampling and playback on the target audio data based on the output sampling rate of the secondary playback device.

The manner by which the secondary playback device determines the output sampling rate based on system time difference is similar to the manner used in step 204, where the primary playback device determines the output sampling rate based on system time difference, which is not elaborated again herein.

In other words, when the secondary playback device and the reference clock device are different playback devices, the output sampling rate is adjusted based on the time difference between the secondary playback device and the reference clock device, so as to eliminate hardware parameter differences between different devices. When the secondary playback device and the reference clock device are the same playback device, the output sampling rate is adjusted based on the time difference of the secondary playback device, so as to eliminate the time difference caused by its own frequency difference of the crystal oscillator, and further improve synchronization precision.

In the embodiments of the present application, the secondary playback device receives the target audio data from the primary playback device and plays the target audio data. In addition, the secondary playback device acts as the reference clock device, periodically broadcasting the target audio synchronization signal. Each playback device periodically performs clock synchronization with the reference clock device based on the target audio synchronization signal, so as to eliminate hardware parameter differences among the playback devices, thereby achieving precise local time synchronization for each playback device. After local time synchronization, the time reference for playing the target audio data is synchronized among the playback devices, thereby improving the precision of synchronized playback.

Figure 6:
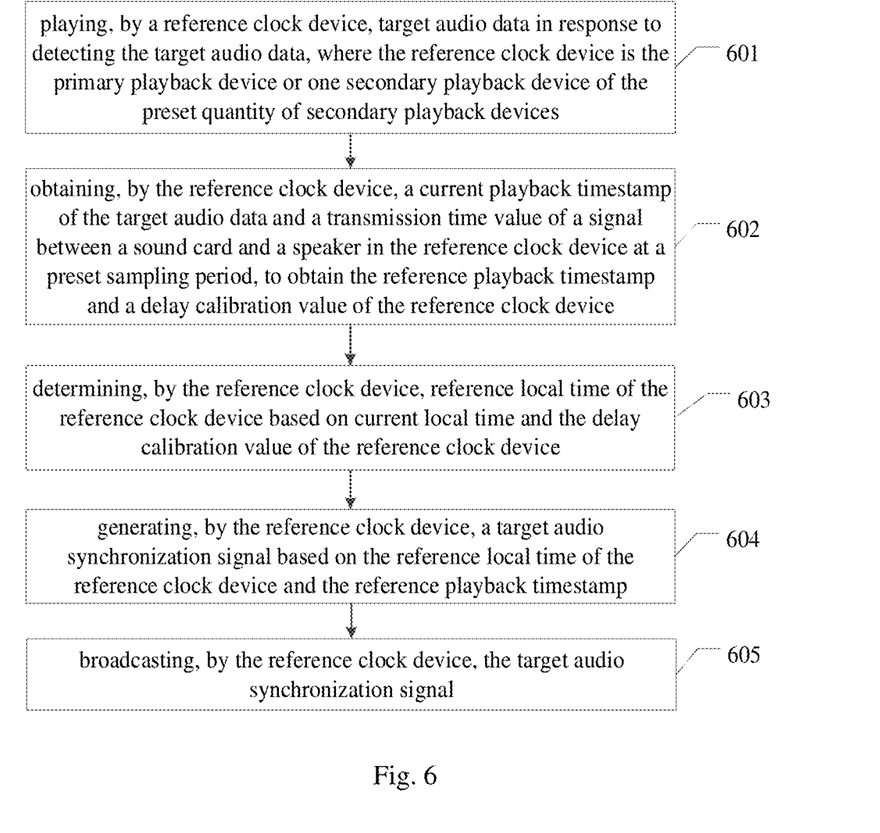
FIG. 6 is a schematic diagram of still yet another embodiment of the audio synchronization playback method according to the embodiments of the present application.

Please refer to FIG. 6, still yet another embodiment of the audio synchronization playback method according to the embodiments of the present application includes the following steps 601-605.

Step 601, playing, by a reference clock device, target audio data in response to detecting the target audio data, where the reference clock device is the primary playback device or one secondary playback device of the preset quantity of secondary playback devices.

The reference clock device is one playback device among the primary playback device and at least one secondary playback device. Optionally, the reference clock device is a playback device with a smallest clock error calibration value among the primary playback device and at least one secondary playback device.

The reference clock device calculates a frequency difference of a crystal oscillator of the reference clock device in each period at a second preset period, and determines a system time difference of the reference clock device according to the frequency difference of the crystal oscillator of the reference clock device. Next, the reference clock device determines an output sampling rate of the reference clock device according to the system time difference of the reference clock device, and performs sampling and playback on the target audio data based on the output sampling rate of the reference clock device.

When the primary playback device or the secondary playback device is a different device from the reference clock device, the primary playback device or the secondary playback device can improve time synchronization precision based on its own system time error with the reference clock device. When the primary playback device or the secondary playback device serves as the reference clock device, the primary playback device or the secondary playback device compares its actual crystal oscillator frequency with the standard crystal oscillator frequency, to obtain a frequency difference of the crystal oscillator of the reference clock device, and subsequently obtain the time difference of the reference clock device. The reference clock device adjusts the output sampling rate of the reference clock device based on the time difference of the reference clock device, so as to achieve accuracy in playing the target audio data and improve synchronization precision.

Step 602, obtaining, by the reference clock device, a current playback timestamp of the target audio data and a transmission time value of a signal between a sound card and a speaker in the reference clock device at a preset sampling period, to obtain the reference playback timestamp and a delay calibration value of the reference clock device.

The reference playback timestamp is a timestamp corresponding to the current playback progress of the target audio data in the reference clock device. The transmission time value of the signal between the sound card and the speaker is a delay time value that exists between the audio card outputting audio data and the speaker outputting sound. Differences in hardware parameters between playback devices cause variations in the delay time value.

Step 603, determining, by the reference clock device, reference local time of the reference clock device based on current local time and the delay calibration value of the reference clock device.

The reference clock device determines a sum of the current local time and the delay calibration value of the reference clock device as the reference local time of the reference clock device. Subsequently, the secondary playback device subtracts its delay calibration value from the reference local time to obtain the local time of the secondary playback device. In this way, regardless of the hardware parameter differences between the reference clock device and the secondary playback device, time references for audio output maintain the same.

Step 604, generating, by the reference clock device, a target audio synchronization signal based on the reference local time of the reference clock device and the reference playback timestamp.

The reference clock device combines the reference local time of the reference clock device with the reference playback timestamp, to generate the target audio synchronization signal.

Step 605, broadcasting, by the reference clock device, the target audio synchronization signal.

The reference clock device broadcasts the target audio synchronization signal, allowing the primary playback device and at least one secondary playback device to receive the target audio synchronization signal.

In the embodiments of the present application, the reference clock device periodically broadcasts the target audio synchronization signal, and each playback device periodically performs clock synchronization with the reference clock device based on the target audio synchronization signal, so as to eliminate hardware parameter differences among the playback devices, thereby achieving precise local time synchronization for each playback device. After local time synchronization, the time reference for playing the target audio data is synchronized among the playback devices, thereby improving the precision of synchronized playback.

In summary, the embodiments in FIG. 2 and FIG. 3 illustrate the audio synchronization playback processes of the primary playback device and the reference clock device respectively. The embodiments in FIG. 4 and FIG. 5 illustrate the audio synchronized playback processes of the secondary playback device and the reference clock device. The operation of the reference clock device is illustrated in FIG. 6. In practical applications, the primary playback device and the secondary playback devices achieve audio synchronization playback based on the reference clock device. Those skilled in the art can obtain the audio synchronization playback method for each playback device in the audio synchronization playback system based on the above embodiments, which will not be elaborated herein.

Those skilled in the art may clearly understand that, for the sake of convenience and brevity of description, the specific working process of the aforementioned system can refer to the corresponding processes in the method embodiments, which are not repeated herein.

If the integrated unit is implemented in the form of software functional units and sold or used as an independent product, it may be stored in a computer readable storage medium. Based on this understanding, essence of the technical solutions of the present application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of the present application. The storage medium includes a USB flash disk, a mobile hard disk, a read-only memory (Read-Only Memory, ROM), a random access memory (Random Access Memory, RAM), a magnetic disk, an optical disk, or other medium which can store program code.

The above embodiments are only used to illustrate the technical solutions of the present application, but shall not be construed as limiting the present application. As can be appreciated by a person skilled in the art, although the present disclosure has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications or replacements do not make the essence of the corresponding technical solutions depart from the spirit and scope of the technical solutions of the embodiments of the present application.

What is claimed is:

1. An audio synchronization playback method, applied to an audio synchronization playback system comprising a primary playback device and a preset quantity of secondary playback devices, the method comprising:
   obtaining, by the primary playback device, target audio data in response to receiving a synchronization playback command;
   sending, by the primary playback device, the target audio data to at least one secondary playback device for playback;
   determining, by the primary playback device, a reference clock device;
   in response to receiving a target audio synchronization signal, synchronizing, by the primary playback device, local time of the primary playback device with local time of the reference clock device based on the target audio synchronization signal and a delay calibration value of the primary playback device, and obtaining, by the primary playback device, a reference playback timestamp of the target audio synchronization signal;
   wherein the target audio synchronization signal is a periodic signal sent by the reference clock device; the reference clock device is a playback device with a smallest clock error calibration value among the primary playback device and at least one secondary playback device; and the delay calibration value is a transmission time value of a signal between a sound card and a speaker; and
   starting, by the primary playback device, playback from a target audio data frame corresponding to the reference playback timestamp;
   wherein starting by the primary playback device playback from the target audio data frame corresponding to the reference playback timestamp comprises:
   calculating, by the primary playback device, a time difference between the primary playback device and the reference clock device in each period at a first preset period to obtain a system time difference of the primary playback device;
   determining, by the primary playback device, an output sampling rate of the primary playback device according to the system time difference of the primary playback device;
   moving, by the primary playback device, to the target audio data frame corresponding to the reference playback timestamp for decoding; and
   starting, by the primary playback device, sampling and playback from the decoded target audio data frame based on the output sampling rate of the primary playback device.

2. The audio synchronization playback method according to claim 1, wherein obtaining by the primary playback device the target audio data in response to receiving the synchronization playback command comprises:
   obtaining, by the primary playback device, original audio data indicated by the synchronization playback command in response to receiving the synchronization playback command;
   obtaining, by the primary playback device, scenario information and determining, by the primary playback device, a target encoding compression algorithm according to the scenario information;
   performing, by the primary playback device, encoding and compression on the original audio data according to the target encoding compression algorithm; and
   adding, by the primary playback device, a timestamp to each compressed audio data frame to obtain the target audio data.

3. The audio synchronization playback method according to claim 2, wherein obtaining by the primary playback device the scenario information and determining by the primary playback device the target encoding compression algorithm according to the scenario information comprises:
   obtaining, by the primary playback device, the scenario information, wherein the scenario information comprises an audio type and network bandwidth information of the original audio data;
   performing, by the primary playback device, selection on preset encoding compression algorithms according to the audio type to obtain a set of encoding compression algorithms; and
   selecting, by the primary playback device, an algorithm from the set of encoding compression algorithms that matches the network bandwidth information to obtain the target encoding compression algorithm.

4. The audio synchronization playback method according to claim 1, further comprising:
   prior to synchronizing by the primary playback device the local time of the primary playback device with reference local time of the reference clock device based on the target audio synchronization signal in response to receiving the target audio synchronization signal and obtaining by the primary playback device the reference playback timestamp of the target audio synchronization signal,
   determining, by the primary playback device, whether the received synchronization signal is the periodic signal sent by the reference clock device in response to receiving the target audio synchronization signal;
   determining, by the primary playback device, that the target audio synchronization signal is received in response to that the received synchronization signal is the periodic signal; and
   determining, by the primary playback device, that the target audio synchronization signal is not detected in response to that the received synchronization signal is not the periodic signal.

5. The audio synchronization playback method according to claim 1, wherein
   synchronizing by the primary playback device the local time of the primary playback device with reference local time of the reference clock device based on the target audio synchronization signal in response to receiving the target audio synchronization signal and obtaining by the primary playback device the reference playback timestamp of the target audio synchronization signal comprises:

analyzing, by the primary playback device, the target audio synchronization signal to obtain the reference local time and the reference playback timestamp of the reference clock device in response to receiving the target audio synchronization signal; wherein the reference playback timestamp indicates a position of the audio data frame currently being played by the reference clock device; and performing, by the primary playback device, time synchronization based on the reference local time of the reference clock device.

6. The audio synchronization playback method according to claim 5, wherein performing by the primary playback device time synchronization based on the reference local time of the reference clock device comprises:

determining, by the primary playback device, current local time of the primary playback device based on the reference local time of the reference clock device and the delay calibration value of the primary playback device.

7. An audio synchronization playback system, comprising a primary playback device and a preset quantity of secondary playback devices, wherein the audio synchronization playback system is configured to perform the audio synchronization playback method according to claim 1.

8. A non-transitory computer-readable storage medium having stored thereon instructions, wherein the instructions, when executed by a processor, cause the processor to perform the audio synchronization playback method according to claim 1.

9. An audio synchronization playback method, applied to an audio synchronization playback system comprising a primary playback device and a preset quantity of secondary playback devices, the method comprising:

playing, by a secondary playback device, target audio data in response to receiving the target audio data from the primary playback device;

in response to receiving a target audio synchronization signal, synchronizing, by the secondary playback device, local time of the secondary playback device with local time of the reference clock device based on the target audio synchronization signal and a delay calibration value of the secondary playback device, and obtaining, by the secondary playback device, a reference playback timestamp of the target audio synchronization signal; wherein the target audio synchronization signal is a periodic signal sent by the reference clock device; the reference clock device is a playback device with a smallest clock error calibration value among the primary playback device and at least one secondary playback device; the delay calibration value is a transmission time value of a signal between a sound card and a speaker; and the reference clock device is determined by the primary playback device; and starting, by the secondary playback device, playback from a target audio data frame corresponding to the reference playback timestamp;

wherein starting by the secondary playback device playback from the target audio data frame corresponding to the reference playback timestamp comprises:

calculating, by the secondary playback device, a time difference between the secondary playback device and the reference clock device in each period at a second preset period to obtain a system time difference of the secondary playback device;

determining, by the secondary playback device, an output sampling rate of the secondary playback device according to the system time difference of the secondary playback device;

moving, by the secondary playback device, to the target audio data frame corresponding to the reference playback timestamp for decoding; and starting, by the secondary playback device, sampling and playback from the decoded target audio data frame based on the output sampling rate of the secondary playback device.

10. The audio synchronization playback method according to claim 9, wherein playing by the secondary playback device the target audio data in response to receiving the target audio data from the primary playback device comprises:

determining, by the secondary playback device, whether there exists audio data matching the target audio data in a preset database in response to receiving the target audio data from the primary playback device;

deleting, by the secondary playback device, the audio data matching the target audio data and storing, by the secondary playback device, the target audio data in the preset database in response to that there exists the audio data matching the target audio data in the preset database;

determining, by the secondary playback device, whether available storage space in the preset database is greater than a size of the target audio data in response to that there does not exist the audio data matching the target audio data in the preset database;

storing, by the secondary playback device, the target audio data in the preset database in response to that the available storage space in the preset database is greater than the size of the target audio data; and in response to that the available storage space in the preset database is not greater than the size of the target audio data, deleting, by the secondary playback device, historical data in the preset database on an individual basis until the available storage space in the preset database is greater than the size of the target audio data, storing, by the secondary playback device, the target audio data in the preset database, and playing, by the secondary playback device, the target audio data.

11. The audio synchronization playback method according to claim 9, wherein synchronizing by the secondary playback device the local time of the secondary playback device with reference local time of the reference clock device based on the target audio synchronization signal in response to receiving the target audio synchronization signal and obtaining by the secondary playback device the reference playback timestamp of the target audio synchronization signal comprises:

analyzing, by the secondary playback device, the target audio synchronization signal to obtain the reference local time and the reference playback timestamp of the reference clock device in response to receiving the target audio synchronization signal; wherein the reference playback timestamp indicates a position of the audio data frame currently being played by the reference clock device; and performing, by the secondary playback device, time synchronization based on the reference local time of the reference clock device.

12. The audio synchronization playback method according to claim 11, wherein performing by the secondary playback device time synchronization based on the reference local time of the reference clock device comprises:

determining, by the secondary playback device, current local time of the secondary playback device based on the reference local time of the reference clock device and the delay calibration value of the secondary playback device.

* * * * *